No. 631,503. Patented Aug. 22, 1899.
C. D. HASKINS.
ELECTRIC METER.
(Application filed June 24, 1898.)
(No Model.)
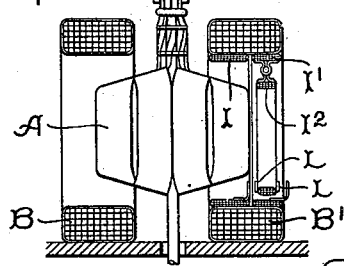
Fig. 2.
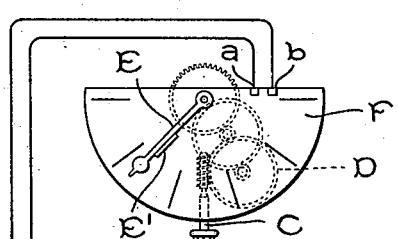
Fig. 1.
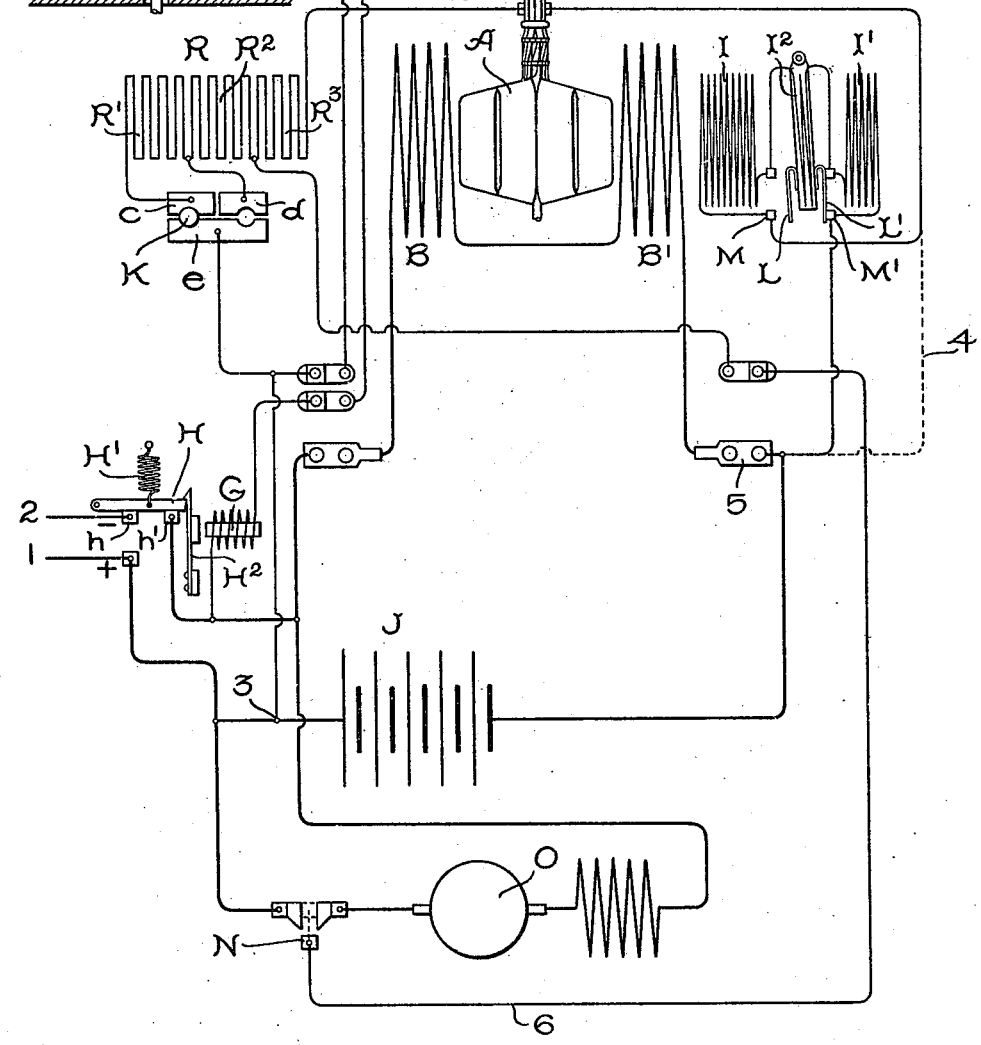
WITNESSES:
A. H. Abell.
A. F. Macdonald.
INVENTOR:
Caryl D. Haskins,
by Albert G. Davis
Atty.
THE NORRIS PETERS CO., PHOTO-LITHO., WASHINGTON, D. C.

UNITED STATES PATENT OFFICE.

CARYL D. HASKINS, OF NEWTON, MASSACHUSETTS, ASSIGNOR TO THE GENERAL ELECTRIC COMPANY, OF NEW YORK.

ELECTRIC METER.

SPECIFICATION forming part of Letters Patent No. 631,503, dated August 22, 1899.

Application filed June 24, 1898. Serial No. 684,360. (No model.)

*To all whom it may concern:*

Be it known that I, CARYL D. HASKINS, a citizen of the United States, residing at Newton, county of Middlesex, State of Massachusetts, have invented certain new and useful Improvements in Electric Meters, (Case No. 665,) of which the following is a specification.

It is customary in installations where storage batteries are employed to record the amount of energy delivered to the battery and also to record the amount of energy delivered by the battery to the mains or translating device after the charging-circuit has been disconnected. It is desirable in an installation of this kind to provide a meter which will indicate the amount of energy delivered and also the amount remaining in the battery, and this without requiring calculation on the part of the attendant. If the efficiency of a storage battery was one hundred per cent. it would be possible to utilize practically any one of the well-known forms of recording wattmeters, which are capable of running both forward and backward; but inasmuch as all storage batteries are more or less inefficient, so that a certain loss takes place on each charge and discharge, it would then be impossible to tell, particularly after the battery had been charged and discharged a number of times, the amount of energy available at the start or at any intermediate discharging-point.

My invention has for its object to provide a recording-meter which is so arranged that by inspection the attendant can determine at any time just how much available energy is in the battery. To accomplish this, I provide a meter organized to run at a certain rate while the batteries are being charged and at a different rate while they are being discharged and so adjust the meter that its forward movement is as great a percentage slower than normal calibration as is represented by the loss or inefficiency of the battery. Thus the amount of available energy will always be directly indicated by the hand or pointer moving over the dial.

In the acompanying drawings, which show an embodiment of my invention, Figure 1 is a diagram of the circuit connections of a meter, and Fig. 2 is a mechanical detail.

My invention is shown in connection with a well-known Thomson recording-wattmeter, but it is equally applicable to other types of meter, and I do not limit myself to the use of a storage battery in connection with the meter, for the invention may be utilized in a variety of ways.

The armature A is mounted on the shaft C for movement between the stationary field-coils B and B', and connected to the shaft by suitable gearing D (shown in dotted lines) is an indicator or pointer E, which travels over the dial F.

The battery is shown at J, connected so as to be charged by the mains 1 and 2. The meter-fields are in series with the battery, and its armature is in multiple, as usual.

The charging-switch H is retracted by a spring H', but during the operation of charging is held closed by a spring-latch $H^2$, thus completing the circuit through the contacts $h\ h'$. A magnet G, in operative relation with the spring-latch, is connected between two points having a potential difference in the arrangement shown between the two mains. The circuit of this magnet is made and broken at contacts $a\ b$. A contact-strip E', shown mounted on the pointer E, is adapted to bridge the contacts $a\ b$, energizing the magnet G, and allow the spring H' to open the switch H when the battery is fully charged.

Where particular accuracy of registration is required, a shunt or starting field-coil I is employed, the strength of which is sufficient to balance the friction of the moving parts; but as my invention can be operated without this feature it will be described hereinafter.

In order to adjust the meter so that it will register when the battery is being charged at a percentage as much below normal calibration as is represented by the loss or inefficiency of the battery, or, in other words, to adjust the parts of the meter so that the pointer will indicate at all times the available energy in the battery, a resistance R is included in circuit with the meter at the time the battery J is being charged. This resistance is divided into several sections $R'$, $R^2$, and $R^3$ and is shown as being connected in series with the armature, this being the simplest arrangement; but any other method of decreasing the speed of registration while the batteries are being charged may be employed. Connected to the sections of resistance are terminals $c$ and $d$, which are insulated from each other and the terminal $e$ except when the plug K is inserted in position. With the parts arranged as shown, assuming that the starting-coils I and I' are omitted, the armature-current flows from point 3 on the positive main through all of the resistance R, the coils of armature A, and through the dotted-line connection 4 to the negative binding-post 5.

The plug-switch N is arranged to control the circuit of the motor O or other translating device which is intended to be supplied by the battery. In addition to this the switch N closes the circuit of the meter-armature through section $R^3$ of the resistance, thereby causing the meter to register at its normal rate. For the purpose of illustration the switch N has been shown in its simplest form; but it is to be understood that its construction may be changed without departing from my invention, so long as the circuit of the meter is closed at or about the time that the circuit of the translating device is completed.

With the parts arranged as shown the current flows from point 3 on the positive main to terminal $e$, through the plug K to terminal $c$, through all of the sections of resistance R to the coils of armature A, the starting-coil I, through the coil $I^2$, which opposes the coil I, contact L', and terminal M' to terminal 5 and the negative side of the battery. The actions of the plug K and of its coils I and $I^2$ will be described below. The current for the field-coils flows from the positive main 1 through the battery to the field-coils, and thence through the switch H to the negative main 2. After the battery has been charged the circuit will be interrupted by the switch H in the manner already described, and the battery will be in readiness to supply current to the motor or any other translating device as soon as the circuit is closed by the plug-switch N. (Shown in dotted lines.) As soon as this is done the sections of resistance R' and $R^2$ are cut out of circuit by means of the wire 6, the connections of the armature transferred from the battery to the motor or other translating device O, and the registration of the meter will be that of its normal calibration. Under these conditions the pointer E will travel in a clockwise direction, and at a faster rate, and when it has reached the extreme left-hand position it will indicate that the battery charge is exhausted. Any intermediate value of the battery charge will also be indicated by the pointer. The resistance shown is so proportioned that when the plug K is inserted between terminals $c$ and $e$ the meter will, while the battery is being charged, run fifty per cent. slow. This is intended for use where the battery has an efficiency of fifty per cent. With the plug K inserted between the terminals $d$ and $e$ the meter will register thirty-five per cent. slow while charging. This is used where the battery has an efficiency of sixty-five per cent. It is evident that by properly proportioning the resistance the meter can be adjusted for use in connection with any storage battery whatever its efficiency.

Thus far I have described a meter for use on motor-carriages or in connection with other electrical apparatus when extreme accuracy is unnecessary; but for certain classes of work—as, for example, a central station employing storage batteries—it is desirable to provide a meter of great accuracy. To accomplish this, a shunt or starting field-coil I is mounted in the meter in such manner that its effect on the armature is sufficient to balance the friction of the moving parts. This is a well-known expedient; but owing to the fact that the meter has to run forward and backward it is necessary to modify the usual arrangement; otherwise the shunt-field would oppose the action of the series field-coils when the current was flowing through the meter in one direction and assist it when flowing in the opposite direction. The shunt-field winding is divided into two coils I and I', which are so wound and disposed with relation to the armature that when energized they tend to produce rotation of the armature in opposite directions. Pivotally supported between the coils is a moving coil $I^2$, and carried by the coil are flexible contacts L and L', which are arranged to make and break the circuit of the stationary contacts M and M'.

In Fig. 2 the starting-coils I and I' are placed within one of the series field-coils and secured in place by any suitable means—as, for example, by a wrapping of tape. For simplicity the starting-coils are shown as being mounted within a single coil; but it is evident that they may be separate and a section placed in or near each field-coil. So long as the coils are arranged in a manner so that they affect the armature equally their precise location is unimportant. The number of turns in coil I differs from that in coil I'. This is to compensate for the turns in coil $I^2$, which are so arranged that when attracted to the right they assist the action of coil I' and when attracted to the left they oppose the action of the coil I. By this arrangement the effect of the starting-coils on the armature is equal, whether it is running forward or backward. The coil $I^2$ being pivotally supported is free to swing either side of the central position under the repulsion and attraction actions between it and the series field-coil. Thus with one direction of current flow in the field-coil the coil $I^2$ would move to the right, while a flow of current through the field-coil in the opposite direction would cause the coil to move toward the left.

What I claim as new, and desire to secure by Letters Patent of the United States, is—

1. In an electric meter which is capable of running forward and backward, the combination of an element influenced by the current flowing in the system, an element influenced by the potential of the system, the two elements being capable of movement with respect to each other, and means for changing the relation of the elements so that the meter will register at one rate for a given flow of current while moving in one direction, and at a different rate for the same flow while traveling in the opposite direction.

2. In an electric meter which is capable of running forward and backward, the combination of an element influenced by the current flowing in the system, an element influenced by the potential of the system, the two elements being capable of movement with respect to each other, means for connecting the meter in circuit in such manner that it will run a certain per cent. slower than normal calibration while current flows through it in one direction, and means for changing the circuit connections so that the meter will run at normal calibration while current flows in the opposite direction.

3. In a system of distribution, the combination of charging-mains, a storage battery, a recording-meter, and means whereby the meter will register at one rate while the battery is being charged and at a different rate while the battery is being discharged.

4. In a system of distribution, the combination of charging-mains, a storage battery, a recording-meter, means controlled by the meter for cutting the battery out of circuit, and means for adjusting the meter so that it will register at one rate while the battery is being charged and at a different rate while the battery is being discharged.

5. In a system of distribution, the combination of supply-mains, a translating device included in circuit therewith, a meter, means for reducing the rate of registration of the meter while current is flowing to the translating device by an amount as much less than normal calibration as is represented by the loss in the translating device, and means for restoring the meter to normal calibration as soon as the translating device begins to deliver current.

6. In a system of distribution, the combination of supply-mains, a storage battery adapted to be charged therefrom, a switch for cutting the battery into and out of circuit, a meter capable of a forward and a backward movement, a pointer arranged to indicate by its relative position the available energy in the battery, and a contact controlled by the pointer for cutting the battery out of circuit.

7. The combination with a storage battery of an electric meter, an armature therefor, a field-magnet, a registering mechanism and a pointer connected to the registering mechanism and adapted to indicate by its relative position the available energy in the battery.

8. The combination with a storage battery of an electric meter comprising an armature and field-magnet movable with respect to each other, a resistance, means for increasing the resistance of the armature by a predetermined amount when the battery is being charged, a translating device, means for including the storage battery in circuit therewith, means for restoring the resistance of the armature to its normal amount, and means for transferring the connections of the meter-armature from the charging-circuit to the battery.

9. In an electric meter which is organized to register while moving backward or forward, an element influenced by the potential, an element influenced by the current, the two parts being movable with respect to each other, a starting device arranged to balance the friction of the moving parts when traveling forward, and a second starting device arranged to balance the friction of the moving parts when traveling in the backward direction, the arrangement being such that only one starting device is in action at a time.

10. In an electric meter which is organized to register while moving forward or backward, an element influenced by the potential, an element influenced by the current, the two parts being movable with respect to each other, a starting-coil which acts inductively on the moving element and is included in circuit when the meter moves in a forward direction, a corresponding starting-coil which is included in circuit when the meter moves in the opposite direction, and means for cutting one of the coils out of circuit when the other is doing work.

11. In an electric meter, which is organized to register while moving forward or backward, an element influenced by the potential, an element influenced by the current, the two parts being movable with respect to each other, a starting-coil to assist the forward movement of the meter parts, a starting-coil to assist the backward movement of the meter parts, and a moving coil arranged to switch the starting-coils into and out of circuit.

12. In an electric meter which is organized to register while moving forward or backward, an element influenced by the potential, an element influenced by the current, the two parts being movable with respect to each other, a starting-coil arranged to assist the movement of the meter parts in one direction, a starting-coil arranged to assist the movement of the meter parts in the opposite direction, the turns of wire in the starting-coils being unequal, and a moving coil for switching the starting-coils into and out of circuit, which is so arranged that it opposes the action of one of the starting-coils and assists the action of the other coil.

13. In an electric meter, the combination of a field-coil, an armature movable within the influence of the field-coil, a starting-coil mounted within the field-coil and arranged to act inductively on the armature, and a movable coil arranged to cut the starting-coil out of circuit under certain conditions.

14. In an electric meter, the combination of a pair of stationary field-coils, an armature mounted for rotary movement within the field-coils, a pair of starting-coils arranged to act oppositely on the armature, the number of turns in one of the starting-coils being greater than in the other, and a pivoted coil arranged to cut the starting-coils into and out of circuit, the pivoted coil being connected in series with and acting to assist one of the starting-coils and opposing the action of the starting-coil which has the greater number of turns.

15. In an electric meter, the combination of an element influenced by the potential of the system, an element influenced by the current of the system, an indicating mechanism, and means for adjusting the parts of the meter so that the indications are modified by an amount depending on the efficiency of the translating device receiving current through the meter.

16. The combination of a translating device capable of charging and discharging current, with an electric measuring instrument, comprising two systems movable both forward and back with respect to each other and a zero position, the arrangement being such that the relative position of the system when moved in one direction indicates the amount of energy delivered to the translating device, and the relative position of the system when moved in the opposite direction the available amount of energy in the translating device, and a single registering or indicating device for registering or indicating both movements.

17. In an electric meter, the combination of two elements which are movable with respect to each other, means for imparting an initial or starting torque to one of the elements, and means for automatically varying the amount of such torque.

18. In an electric meter, the combination of two elements which are movable with respect to each other both forward and back, means for imparting an initial or starting torque to one of the elements, and means for varying the effect of the starting torque in accordance with the direction of movement of the moving element.

19. The combination of a meter arranged to register at one rate while moving in one direction and at a different rate while moving in the opposite direction, a translating device arranged to be connected in circuit therewith, and a switch for controlling the circuit of the translating device, the position of said switch determining the rate at which the meter will register.

20. As a means of indicating the amount of energy in an electrical storage device, a meter arranged to register when current is passed through it in either direction, but at different rates.

In witness whereof I have hereunto set my hand this 22d day June, 1898.

CARYL D. HASKINS.

Witnesses:
FRANK P. COX,
A. F. MACDONALD.